US012510103B2

(12) United States Patent
Chuang et al.

(10) Patent No.: US 12,510,103 B2
(45) Date of Patent: Dec. 30, 2025

(54) COVER, FAN UNIT, AND VENTILATION FAN

(71) Applicant: DELTA ELECTRONICS, INC., Taoyuan (TW)

(72) Inventors: Ying-Huang Chuang, Taoyuan (TW); Wen-Chih Li, Taoyuan (TW); Chun-Wei Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/798,803

(22) Filed: Aug. 8, 2024

(65) Prior Publication Data

US 2025/0084870 A1 Mar. 13, 2025

(30) Foreign Application Priority Data

Sep. 8, 2023 (CN) ......................... 202311158770.4

(51) Int. Cl.

| | |
|---|---|
| ***F24F 7/007*** | (2006.01) |
| ***F04D 29/42*** | (2006.01) |
| ***F04D 29/66*** | (2006.01) |
| *F24F 13/20* | (2006.01) |

(52) U.S. Cl.

CPC ....... *F04D 29/665* (2013.01); *F04D 29/4226* (2013.01); *F24F 7/007* (2013.01); *F05D 2250/51* (2013.01); *F24F 2013/205* (2013.01)

(58) Field of Classification Search

CPC .......... F24F 13/20; F24F 13/205; F24F 13/24; F24F 7/007; F24F 1/0022; F04D 29/4226

See application file for complete search history.

(56) References Cited

U.S. PATENT DOCUMENTS

| | | | | |
|---|---|---|---|---|
| 6,604,906 B2 | 8/2003 | Ozeki et al. | | |
| 7,203,416 B2 * | 4/2007 | Craw | F24H 3/0411 | 392/350 |
| 7,470,179 B1 * | 12/2008 | Ritter | F24F 13/084 | 454/349 |
| 8,123,468 B2 | 2/2012 | Shirahama et al. | | |
| 9,303,859 B2 * | 4/2016 | Horng | F04D 29/005 | |
| 9,441,642 B2 | 9/2016 | Rao et al. | | |
| 9,915,273 B2 | 3/2018 | Katsumata et al. | | |
| 9,951,781 B2 * | 4/2018 | Choi | F24F 1/0022 | |
| 10,054,320 B2 * | 8/2018 | Choi | F24F 13/24 | |
| 10,352,584 B2 * | 7/2019 | Huang | F24F 7/007 | |
| 10,690,137 B2 | 6/2020 | Liu et al. | | |

(Continued)

FOREIGN PATENT DOCUMENTS

| | | |
|---|---|---|
| CN | 101535656 B | 5/2011 |
| CN | 102192194 B | 12/2014 |

(Continued)

*Primary Examiner* — Justin D Seabe

(74) *Attorney, Agent, or Firm* — CKC & Partners Co., LLC

(57) ABSTRACT

A cover used in a ventilation fan includes a noise reduction structure and a shelter. The noise reduction structure has an air inlet, a flat portion surrounding the air inlet, and a peripheral portion surrounding the flat portion. The sidewall of the flat portion extends in a vertical direction from the peripheral portion. The bottom surface of the flat portion extends in a horizontal direction from the sidewall, and is a flat surface. The shelter is disposed on the peripheral portion and covers the air inlet.

17 Claims, 15 Drawing Sheets

(56) References Cited

U.S. PATENT DOCUMENTS

| | | | | |
|---|---|---|---|---|
| 11,015,822 | B2 * | 5/2021 | Branham ................ | F24F 13/20 |
| 11,326,792 | B2 * | 5/2022 | Mergener ................ | F24F 7/013 |
| 11,543,150 | B2 | 1/2023 | Chuang et al. | |
| 2020/0191420 | A1 | 6/2020 | Lee et al. | |

FOREIGN PATENT DOCUMENTS

| | | | | |
|---|---|---|---|---|
| CN | 204611553 | U | | 9/2015 |
| CN | 105051374 | A | | 11/2015 |
| CN | 205423324 | U | | 8/2016 |
| CN | 110345110 | A | | 10/2019 |
| CN | 111279085 | B | | 7/2022 |
| CN | 115727419 | A | | 3/2023 |
| JP | 2001182692 | A | * | 7/2001 |
| JP | 2007127089 | A | | 5/2007 |
| JP | 5151631 | B2 | | 2/2013 |
| TW | 272251 | B | | 3/1996 |
| TW | I281375 | B | | 5/2007 |
| TW | M344460 | U | | 11/2008 |
| WO | 2019/082949 | A1 | | 5/2019 |

* cited by examiner

130a

COVER, FAN UNIT, AND VENTILATION FAN

CROSS-REFERENCE TO RELATED APPLICATIONS

This application claims priority to China Application Serial Number 202311158770.4, filed Sep. 8, 2023 which is herein incorporated by reference.

BACKGROUND

Field of Invention

The present disclosure relates to a cover, a fan unit, and a ventilation fan having the cover and the fan unit.

Description of Related Art

Generally speaking, the product characteristics of ventilation fans are mainly related to blowing rate, noise level and power consumption, in which the noise level has the most direct impact on the user's experience. In innovative products, increasing the blowing rate in a limited product size will bring with the increase in noise.

For the aforesaid reason, in order to the need to increase blowing rate, the inventor proposes a noise reduction mechanism within the original product size, and the noise reduction mechanism can be used in a ventilation fan.

SUMMARY

According to some embodiments of the present disclosure, a cover includes a noise reduction structure and a shelter. The noise reduction structure has an air inlet, a flat portion surrounding the air inlet, and a peripheral portion surrounding the flat portion, wherein a sidewall of the flat portion extends in a vertical direction from the peripheral portion, a bottom surface of the flat portion extends in a horizontal direction from the sidewall of the flat portion, and the bottom surface of the flat portion is a flat surface. The shelter is disposed on the peripheral portion and covers the air inlet.

According to some embodiments of the present disclosure, a fan unit includes a motor, an impeller, and a vortex flow channel. The impeller is connected to and driven by the motor. The vortex flow channel surrounds the impeller along a circumferential direction of the impeller, and has an air outlet. A top portion of the vortex flow channel includes a curved surface. A diameter and a cross-sectional height of the curved surface are gradually increased from the air outlet to an area along the circumferential direction, and the area is passed by a cross section that passes through a center of the impeller and is parallel to the air outlet.

According to some embodiments of the present disclosure, a ventilation fan includes a housing, a fan unit, and a cover. A top edge of the housing surrounds an opening. The fan unit is located in the housing and includes a motor, an impeller, and a vortex flow channel. The impeller is connected to and driven by the motor. The vortex flow channel surrounds the impeller along a circumferential direction of the impeller, and has an air outlet. A top portion of the vortex flow channel includes a curved surface. A diameter and a cross-sectional height of the curved surface are gradually increased from the air outlet to an area along the circumferential direction, and the area is passed by a cross section that passes through a center of the impeller and is parallel to the air outlet. The cover is located on the top edge of the housing and covers the opening. The cover includes a noise reduction structure and a shelter. The noise reduction structure has an air inlet, a flat portion surrounding the air inlet, and a peripheral portion surrounding the flat portion, wherein a sidewall of the flat portion extends in a vertical direction from the peripheral portion, a bottom surface of the flat portion extends in a horizontal direction from the sidewall of the flat portion, and the bottom surface of the flat portion is a flat surface. The shelter is disposed on the peripheral portion and covers the air inlet.

In the aforementioned embodiments of the present disclosure, since the cover includes the noise reduction structure that has the air inlet and the flat portion, the noise reduction structure can regulate an air flow before the air flow enters the fan unit such that the air flow is concentrated to form an air column to enter the vortex flow channel of the fan unit smoothly. The flat portion of the noise reduction structure is equivalent to an additional sound insulation structure to reduce the energy of noise sound wave. A sound wave path difference generated by two resonance spaces is formed between the flat portion and the shelter and between the flat portion and the bottom portion of the housing. As a result, the air flow can resonate in the resonance spaces, such that sound waves collide repeatedly to spread, and that the energy can be gradually reduced to decrease the noise. Moreover, since the top portion of the vortex flow channel of the fan unit includes the curved surface and the diameter and the cross-sectional height of the curved surface are gradually increased from the air outlet along the circumferential direction, different sound wave path differences can be generated in the vortex flow channel to achieve the noise reduction effect of reverse synthesis of sound waves. In addition, the top portion of the vortex flow channel has a convex feature, and thus the inner space of the channel is increased to achieve the effect of increasing blowing rate.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
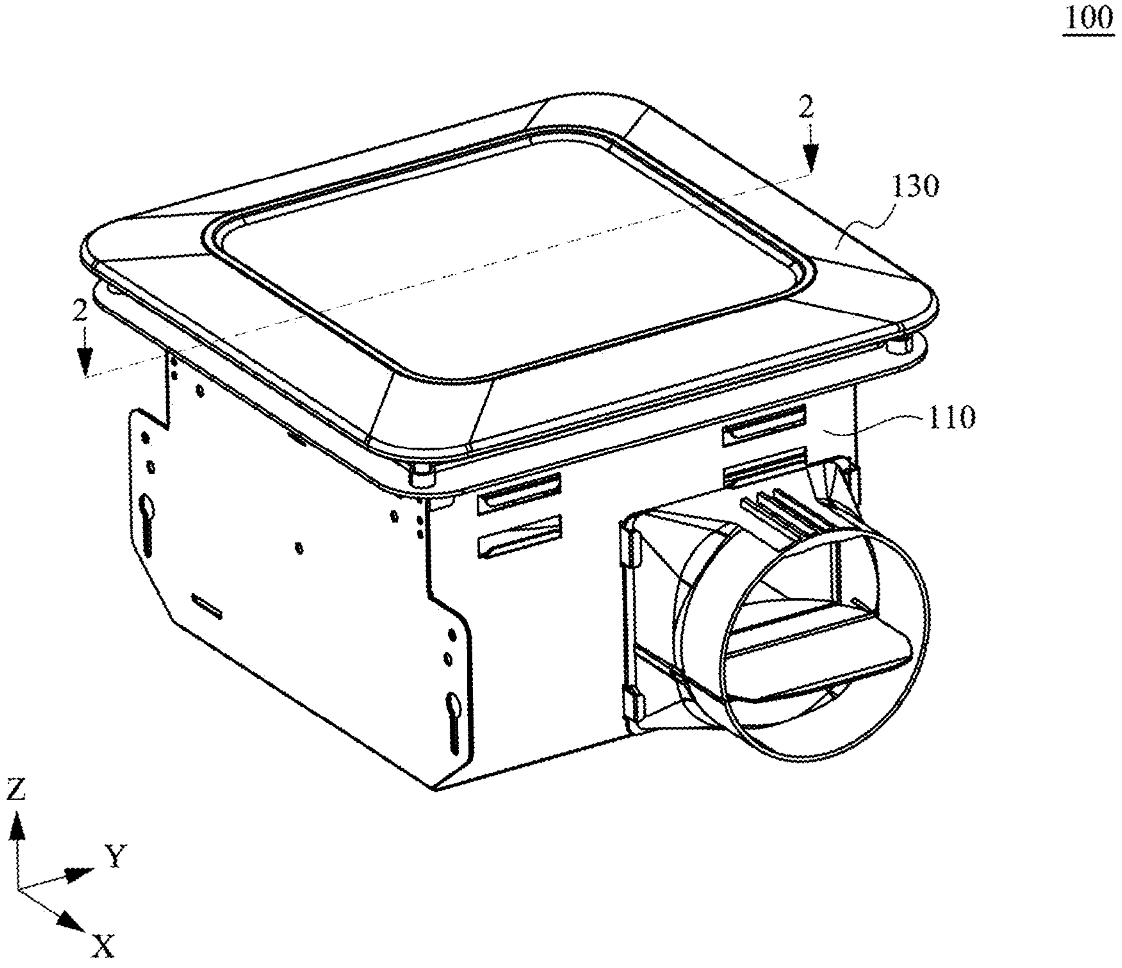
FIG. 1 is a perspective view of a ventilation fan according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
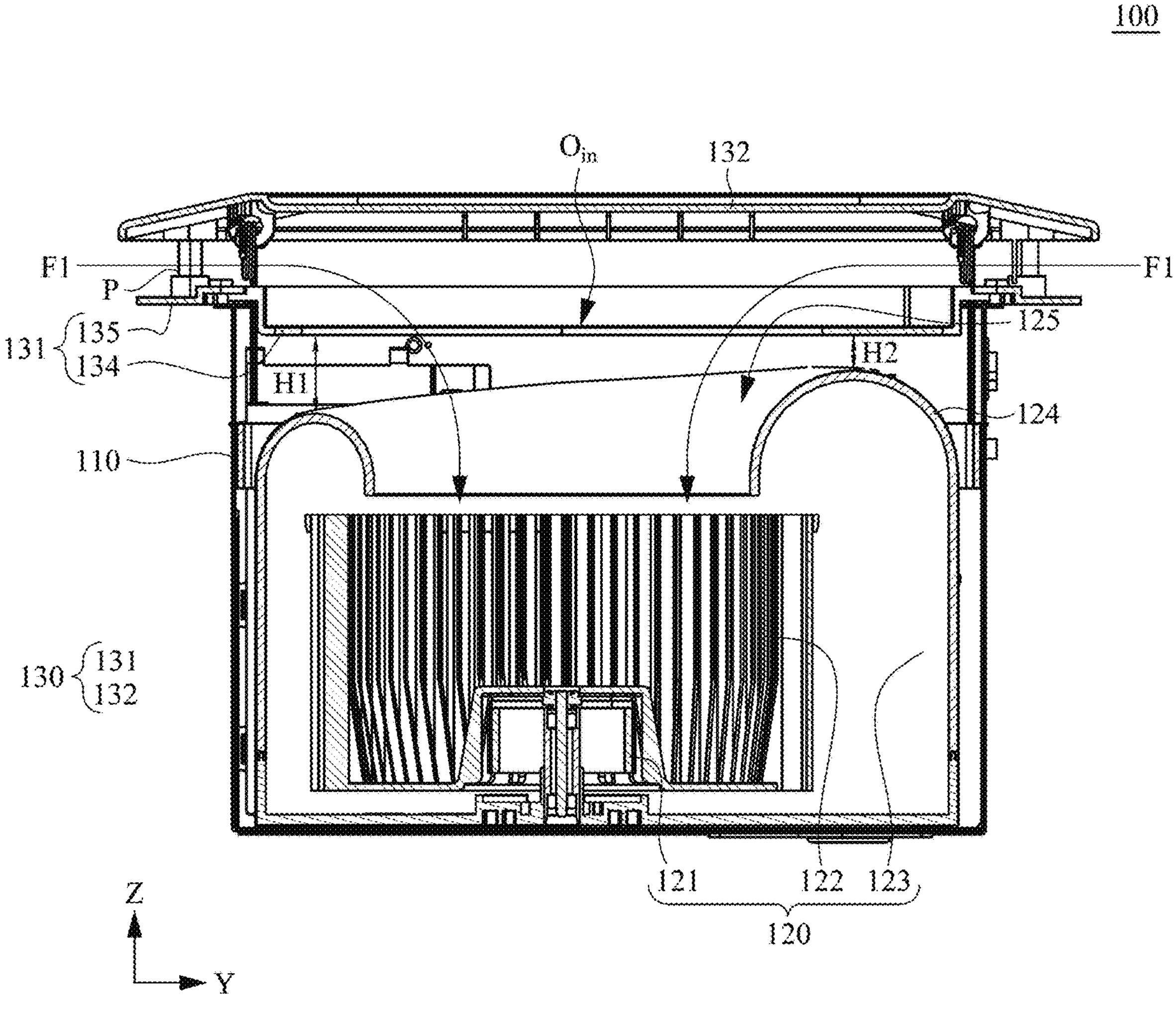
FIG. 2 is a cross-sectional view of the ventilation fan taken along line 2-2 of FIG. 1.

FIG. 1 is a perspective view of a ventilation fan 100 according to one embodiment of the present disclosure. FIG. 2 is a cross-sectional view of the ventilation fan 100 taken along line 2-2 of FIG. 1. As shown in FIGS. 1 and 2, the ventilation fan 100 includes a housing 110, a fan unit 120 located in the housing 110, and a cover 130. The cover 130 includes a noise reduction structure 131 and a shelter 132. The noise reduction structure 131 has an air inlet $O_{in}$, a flat portion 134 surrounding the air inlet $O_{in}$, and a peripheral portion 135 that surrounds the flat portion 134. The shelter 132 is disposed on the peripheral portion 135 of the noise reduction structure 131, and covers the air inlet $O_{in}$. The fan unit 120 includes a motor 121, an impeller 122, and a vortex flow channel 123. The motor 121 and the impeller 122 are located in the space of the fan unit 120. The impeller 122 is connected to and driven by the motor 121. The motor 121 can drive the impeller 122 to move to form an air flow F1.

In this embodiment, the shelter 132 has a column spacer P located on the peripheral portion 135 of the noise reduction structure 131, such that a certain gap is maintained between the shelter 132 and the noise reduction structure 131. When the fan unit 120 is in operation, the air flow F1 can sequentially pass through the gap between the shelter 132 and the noise reduction structure 131 and the air inlet $O_{in}$ of the noise reduction structure 131 to divert, and then the air flow F1 enters the vortex flow channel 123. In other words, the ventilation fan 100 having the cover 130 can realize side air intake.

Figure 3:
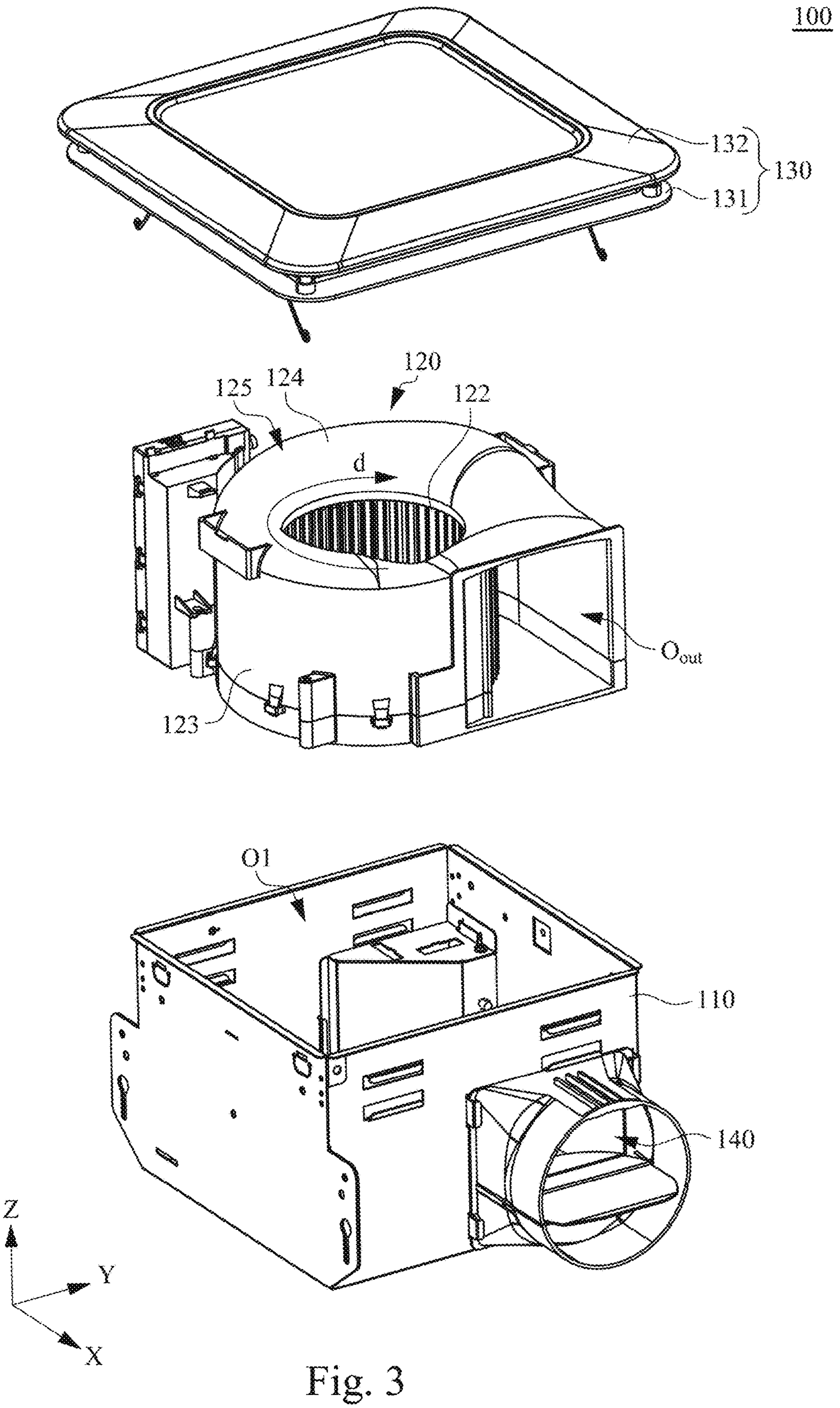
FIG. 3 is an exploded view of the ventilation fan of FIG. 1.

FIG. 3 is an exploded view of the ventilation fan 100 of FIG. 1. As shown in FIGS. 2 and 3, the top edge of the housing 110 defines an opening O1. The fan unit 120 is located in the housing 110. The cover 130 is located on the top edge of the housing 110 and covers the opening O1. The vortex flow channel 123 of the fan unit 120 surrounds the impeller 122 along a circumferential direction d of the impeller 122, and has an air outlet $O_{out}$. After the air flow F1 enters the air inlet at the center of the vortex flow channel 123, the air flow F1 can be driven by the impeller 122 to be discharged from the air outlet $O_{out}$. The air outlet $O_{out}$ and the air outlet 140 of the housing 110 are docked to discharge the air flow F1 from the housing 110 through the air outlet 140.

The ventilation fan 100 is assembled to a ceiling when used by consumers. The ventilation fan 100 shown in FIG. 2 can be turned 180 degrees to embed the housing 110 in the ceiling, and thus the shelter 132 of the cover 130 faces downward. In other words, when the ventilation fan 100 is assembled to a ceiling, the positive Z-axis direction points to the ground. The material of the noise reduction structure 131 and the shelter 132 of the cover 130 can be plastic, the material of the housing 110 can be metal, but the present disclosure is not limited to this regard.

In the following description, the structure of the cover 130 will be explained in detail.

Figure 4A:
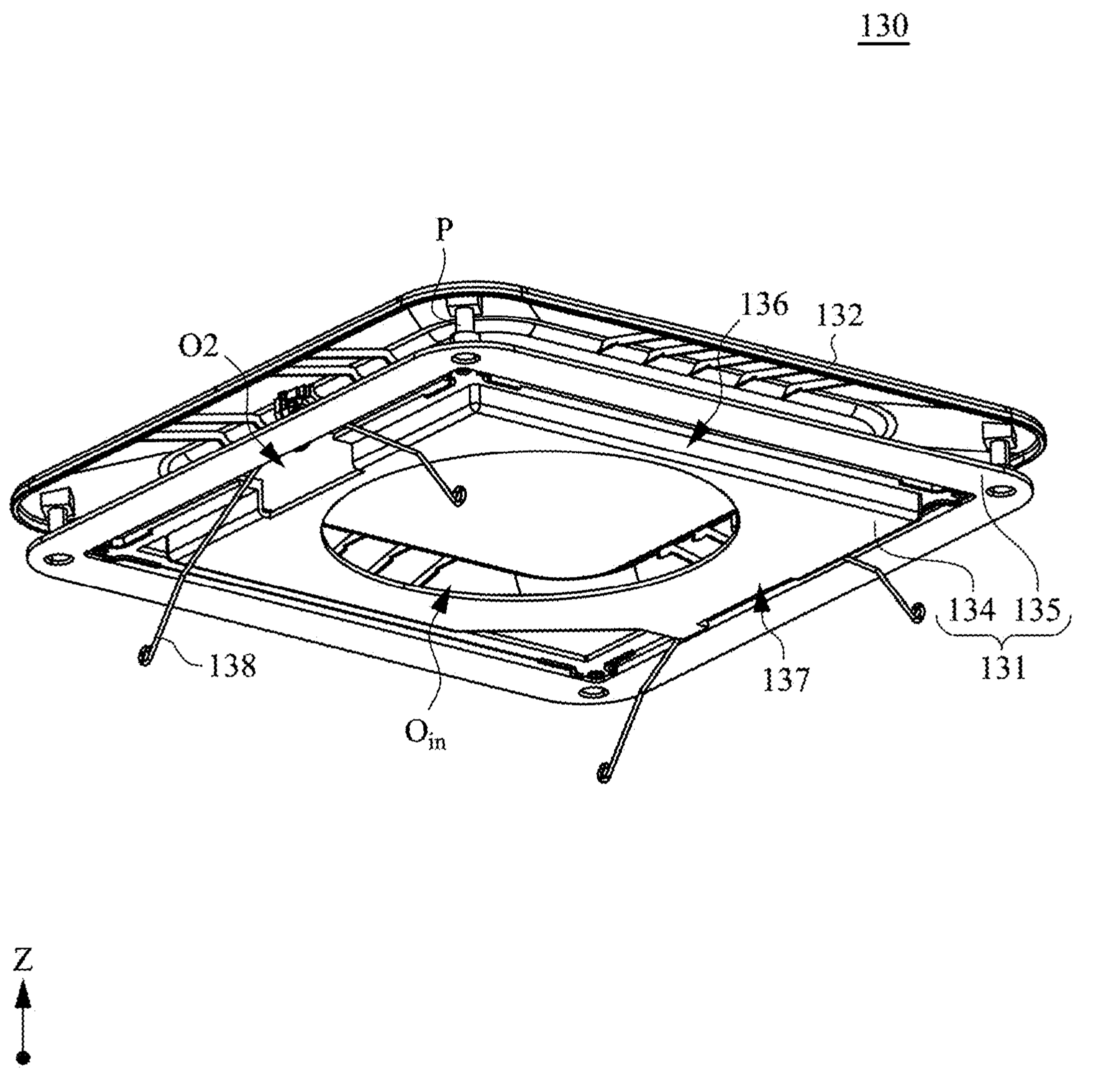
FIG. 4A is a perspective view of a cover of FIG. 3 when viewed from below.
Figure 4B:
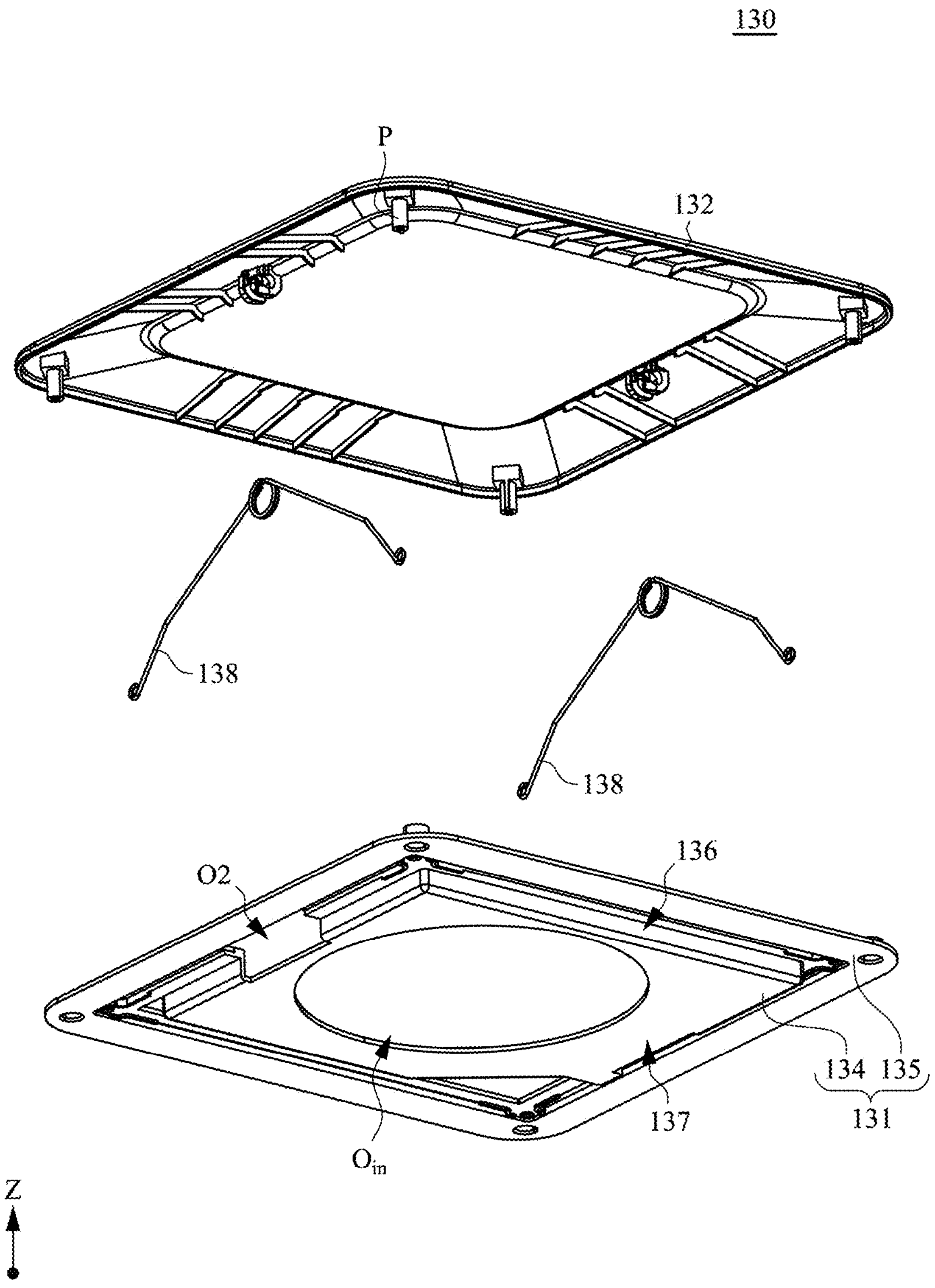
FIG. 4B is an exploded view of the cover of FIG. 4A.

FIG. 4A is a perspective view of the cover 130 shown in FIG. 3 when viewed from below. FIG. 4B is an exploded view of the cover 130 shown in FIG. 4A. As shown in FIGS. 2, 4A, and 4B, a sidewall 136 of the flat portion 134 of the noise reduction structure 131 extends in a vertical direction (e.g., the negative Z-axis direction) from the peripheral portion 135. A bottom surface 137 of the flat portion 134 extends in a horizontal direction (e.g., the positive X-axis or Y-axis direction) from the sidewall 136, and the bottom surface 137 of the flat portion 134 is a flat surface. The flat portion 134 is positioned in the housing 110, and thus the sidewall 136 of the flat portion 134 can face toward the inner sidewall of the housing 110. That is to say, the bottom surface 137 of the flat portion 134 is lower than the top edge of the housing 110 such that the flat portion 134 is located in the housing 110.

The peripheral portion 135 of the noise reduction structure 131 has an opening O2. The cover 130 further includes a spring element 138. The spring element 138 is connected to the shelter 132 and passes through the opening O2 of the peripheral portion 135. Furthermore, an end of the spring element 138 facing away from the shelter 132 may be fixed on the inside wall of the housing 110 or on the outside of the vortex flow channel 123. The peripheral portion 135 of the noise reduction structure 131 extends outward from the outer sidewall of the housing 110. The outer edge of the shelter 132 is further outside than the outer edge of the peripheral portion 135 of the noise reduction structure 131. In this embodiment, a top portion 124 of the vortex flow channel 123 includes a curved surface 125, and there are different vertical distances between the flat portion 134 of the noise reduction structure 131 and the top portion 124 of the vortex flow channel 123. For example, as shown in FIG. 2, a vertical distance H1 is less than a vertical distance H2. In another embodiment, the housing 110 may accommodate a vortex flow channel having a top portion that is a flat surface, such that the distances between the flat portion 134 of the noise reduction structure 131 and said top portion of the vortex flow channel are the same.

Specifically, since the cover 130 includes the noise reduction structure 131 that has the air inlet $O_{in}$ and the flat portion 134, the noise reduction structure 131 can regulate the air flow F1 before the air flow F1 enters the fan unit 120 such that the air flow F1 is concentrated to form an air column to enter the vortex flow channel 123 of the fan unit 120 smoothly. The flat portion 134 of the noise reduction structure 131 is equivalent to an additional sound insulation structure to reduce the energy of noise sound wave. A sound wave path difference generated by two resonance spaces is formed between the flat portion 134 and the shelter 132 and between the flat portion 134 and the bottom portion of the housing 110. As a result, the air flow F1 can resonate in the resonance spaces, such that sound waves collide repeatedly to spread, and that the energy can be gradually reduced to decrease the noise. Moreover, since the top portion 124 of the vortex flow channel 123 of the fan unit 120 includes the curved surface 125, different sound wave path differences can be generated in the vortex flow channel 123 to achieve the noise reduction effect of reverse synthesis of sound waves. In addition, the top portion 124 of the vortex flow channel 123 has a convex feature, and thus the inner space of the channel is increased to achieve the effect of increasing blowing rate.

In the following description, other types of the cover will be explained.

Figure 5:
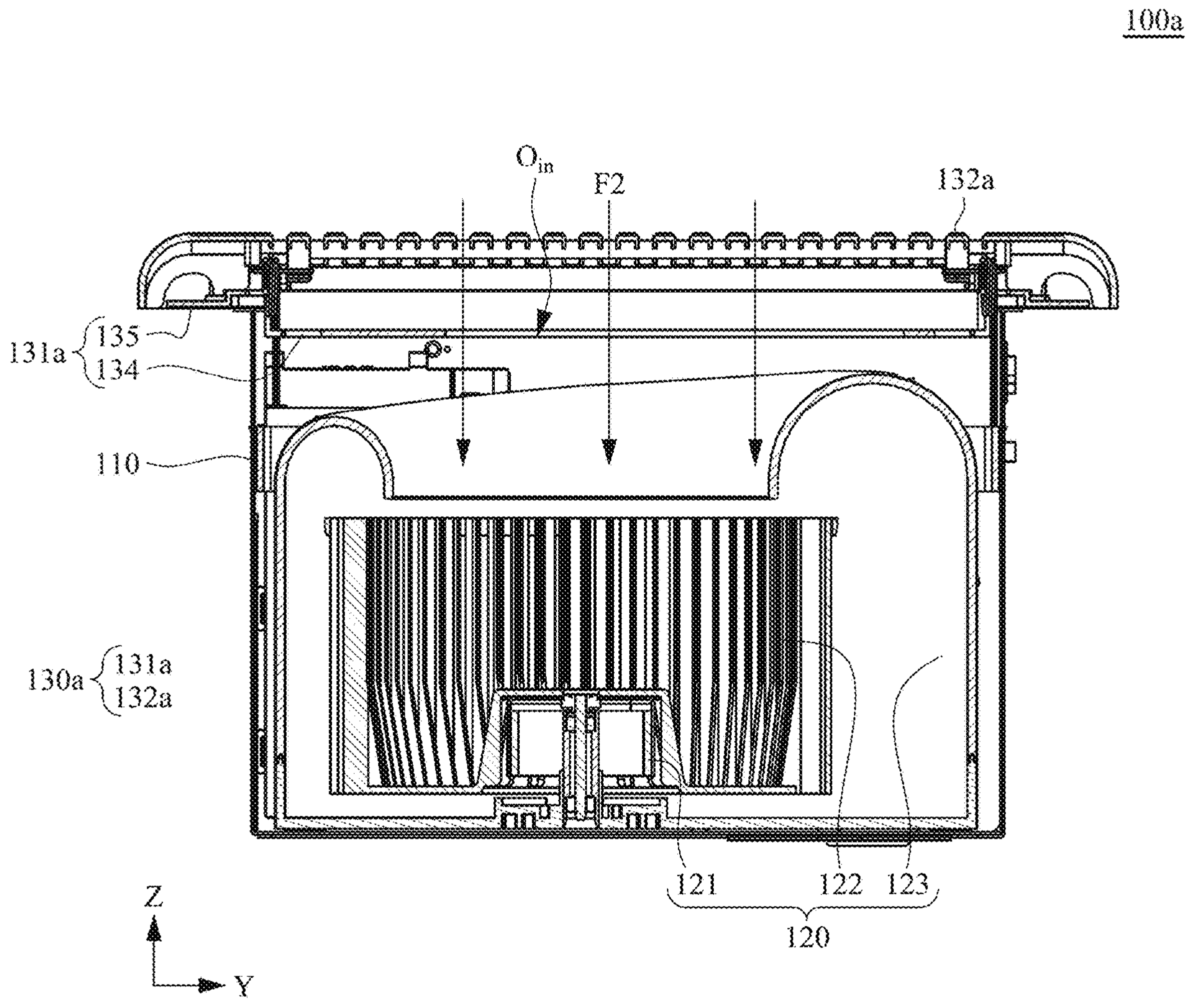
FIG. 5 is a cross-sectional view of a ventilation fan according to another embodiment of the present disclosure.
Figure 6:
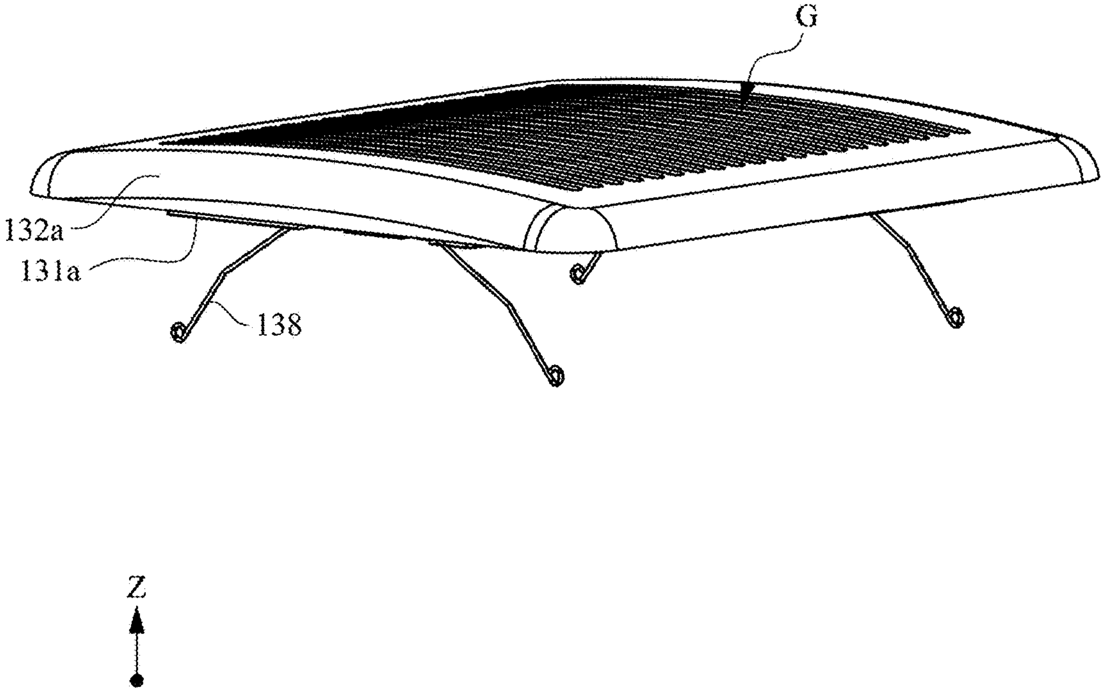
FIG. 6 is a perspective view of the cover of FIG. 5.

FIG. 5 is a cross-sectional view of a ventilation fan 100*a* according to another embodiment of the present disclosure. FIG. 6 is a perspective view of the cover 130*a* of FIG. 5. As shown in FIGS. 5 and 6, the ventilation fan 100*a* includes the housing 110, the fan unit 120, and the cover 130*a*. The cover 130*a* includes a noise reduction structure 131*a* and a shelter 132*a*. When the fan unit 120 is in operation, the air flow F2 can sequentially pass through the grille G of the shelter 132*a* and the air inlet $O_{in}$ of the noise reduction structure 131*a* so as not to divert, and then the air flow F2 enters the vortex flow channel 123. In other words, the ventilation fan 100*a* having the cover 130*a* can realize front air intake.

Figure 7A:
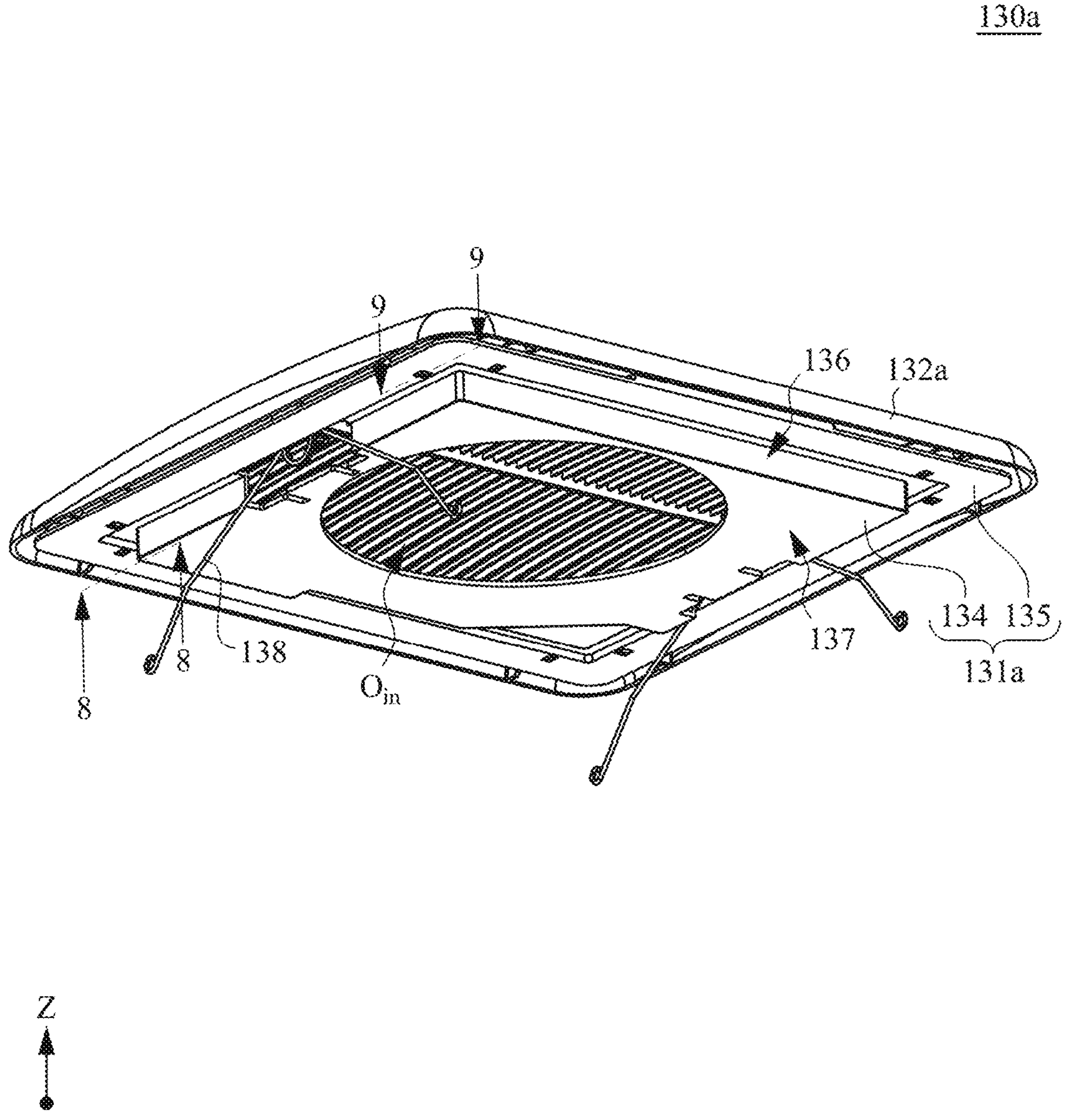
FIG. 7A is a perspective view of the cover of FIG. 6 when viewed from below.
Figure 7B:
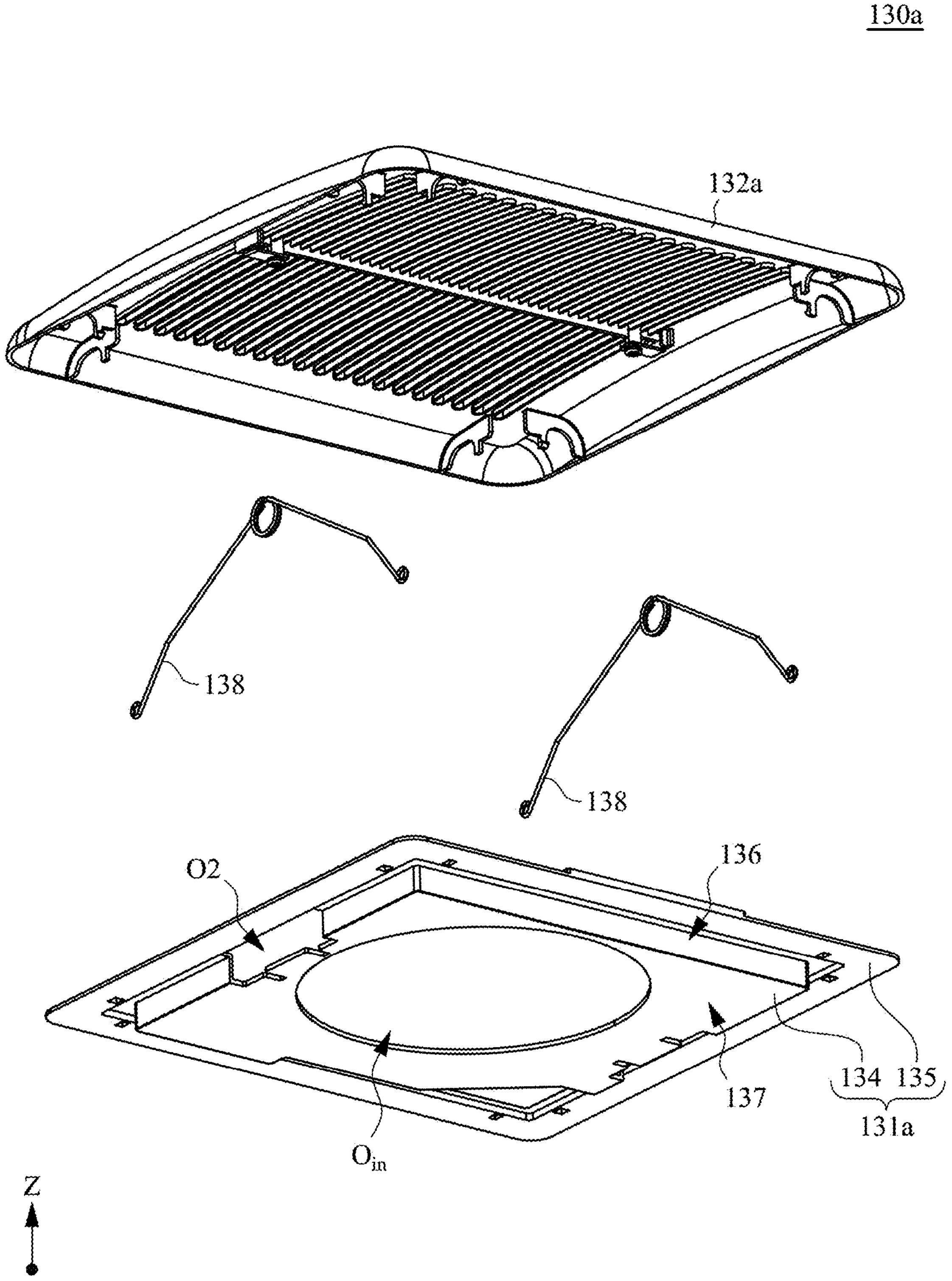
FIG. 7B is an exploded view of the cover of FIG. 7A.
Figure 8:
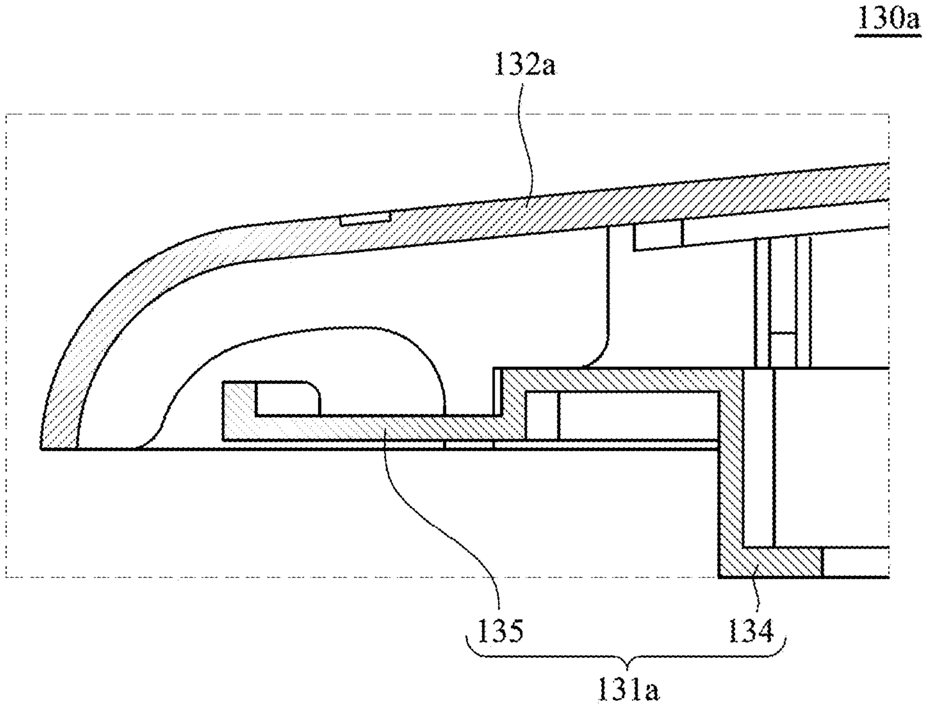
FIG. 8 is a cross-sectional view of the cover taken along line 8-8 of FIG. 7A.

FIG. 7A is a perspective view of the cover 130*a* shown in FIG. 6 when viewed from below. FIG. 7B is an exploded view of the cover 130*a* shown in FIG. 7A. FIG. 8 is a cross-sectional view of the cover 130*a* taken along line 8-8 shown in FIG. 7A. As shown in FIGS. 7A, 7B, and 8, in this embodiment, the bottom surface of the shelter 132*a* is lower than the bottom surface of the peripheral portion 135 of the noise reduction structure 131*a* to prevent the noise reduction structure 131*a* from being exposed. When the ventilation fan 100*a* is turned 180 degrees to assemble to a ceiling, the shelter 132*a* faces downward and shields the noise reduction structure 131*a*, the housing 110, and the fan unit 120 to facilitate aesthetic design of the ventilation fan 100*a*.

Figure 9:
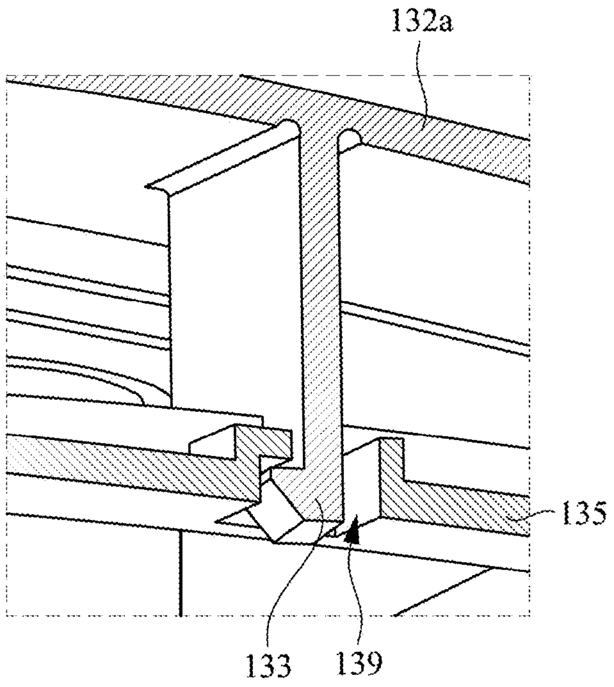
FIG. 9 is a cross-sectional view of the cover taken along line 9-9 of FIG. 7A.

FIG. 9 is a cross-sectional view of the cover 130*a* taken along line 9-9 shown in FIG. 7A. As shown in FIGS. 7A and 9, the shelter 132*a* further has a fastening hook 133, and the peripheral portion 135 of the noise reduction structure 131*a* has a fastening recess 139. The fastening hook 133 of the shelter 132*a* may be coupled with the fastening recess 139 of the peripheral portion 135 of the noise reduction structure 131*a*, thereby positioning the shelter 132*a* on the noise reduction structure 131*a*.

It is to be noted that the connection relationships, the materials, and the advantages of the elements with the same symbol will not be repeated in the following description. In the following description, the design for the aforementioned vortex flow channel 123 of the fan unit 120 will be further explained.

Figure 10:
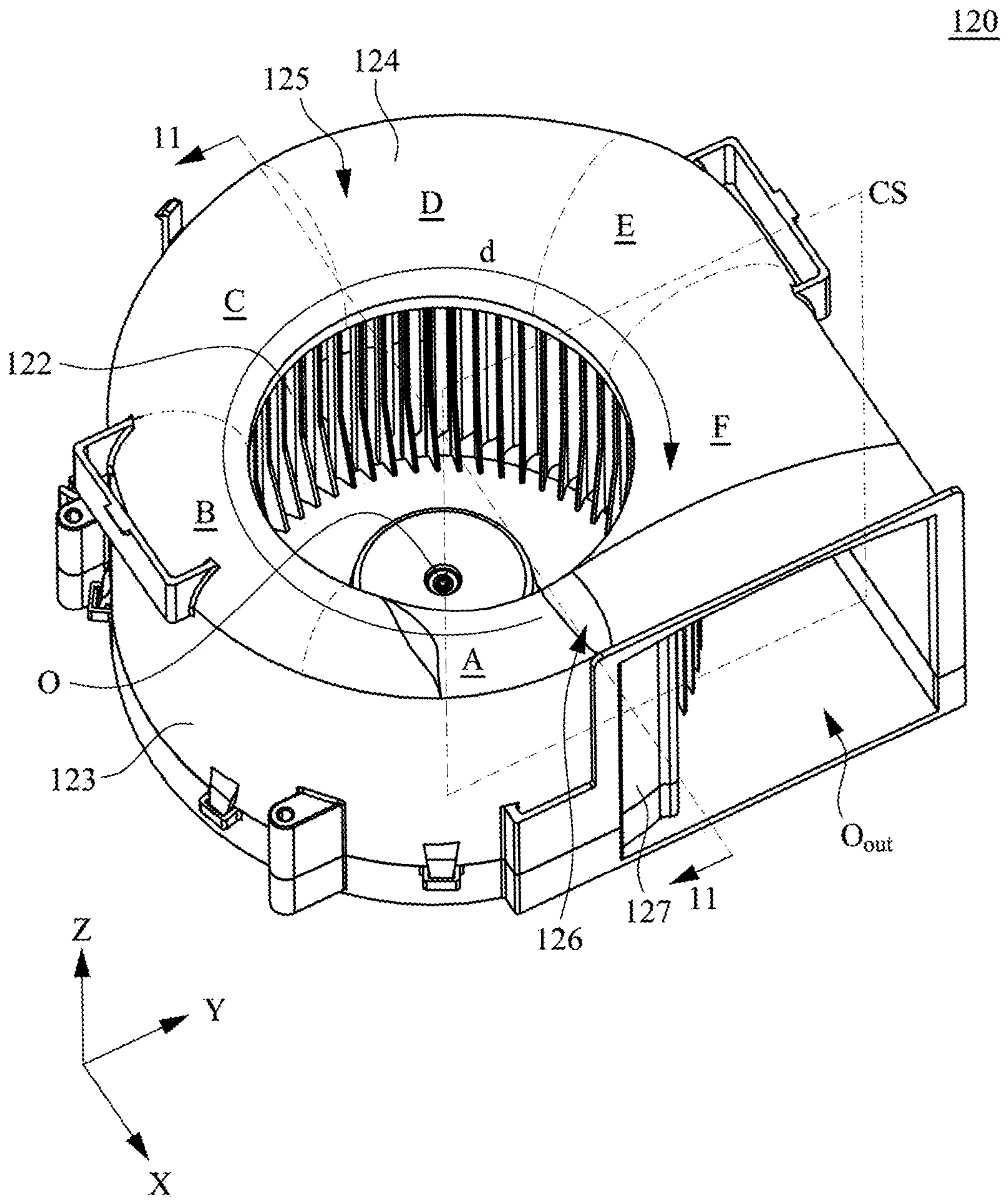
FIG. 10 is an enlarged view of a fan unit of FIG. 3.

FIG. 10 is an enlarged view of a fan unit 120 shown in FIG. 3. The vortex flow channel 123 is a divergent channel, and has diameter gradient and height gradient designs. The vortex flow channel 123 has a tongue portion 127 proximal to the air outlet $O_{out}$. In this embodiment, the diameter and the cross-sectional height of the curved surface 125 of the top portion 124 of the vortex flow channel 123 are gradually increased from the air outlet $O_{out}$ to an area E along the circumferential direction d, and the area E is passed by a cross section CS that passes through a center O of the impeller 122 and is parallel to the air outlet $O_{out}$. The cross section CS is the range surrounded by the dotted line shown in FIG. 10. The top portion 124 of the vortex flow channel 123 can sequentially include an area A, an area B, an area C, an area D, the area E, and the area F along the circumferential direction d. The cross section CS is located between the area E and the area F, and the tongue portion 127 is located between the area F and the area A. In some embodiments, the top view shape of the top portion 124 of the vortex flow channel 123 may be round, nearly round, or polygonal.

Figure 11:
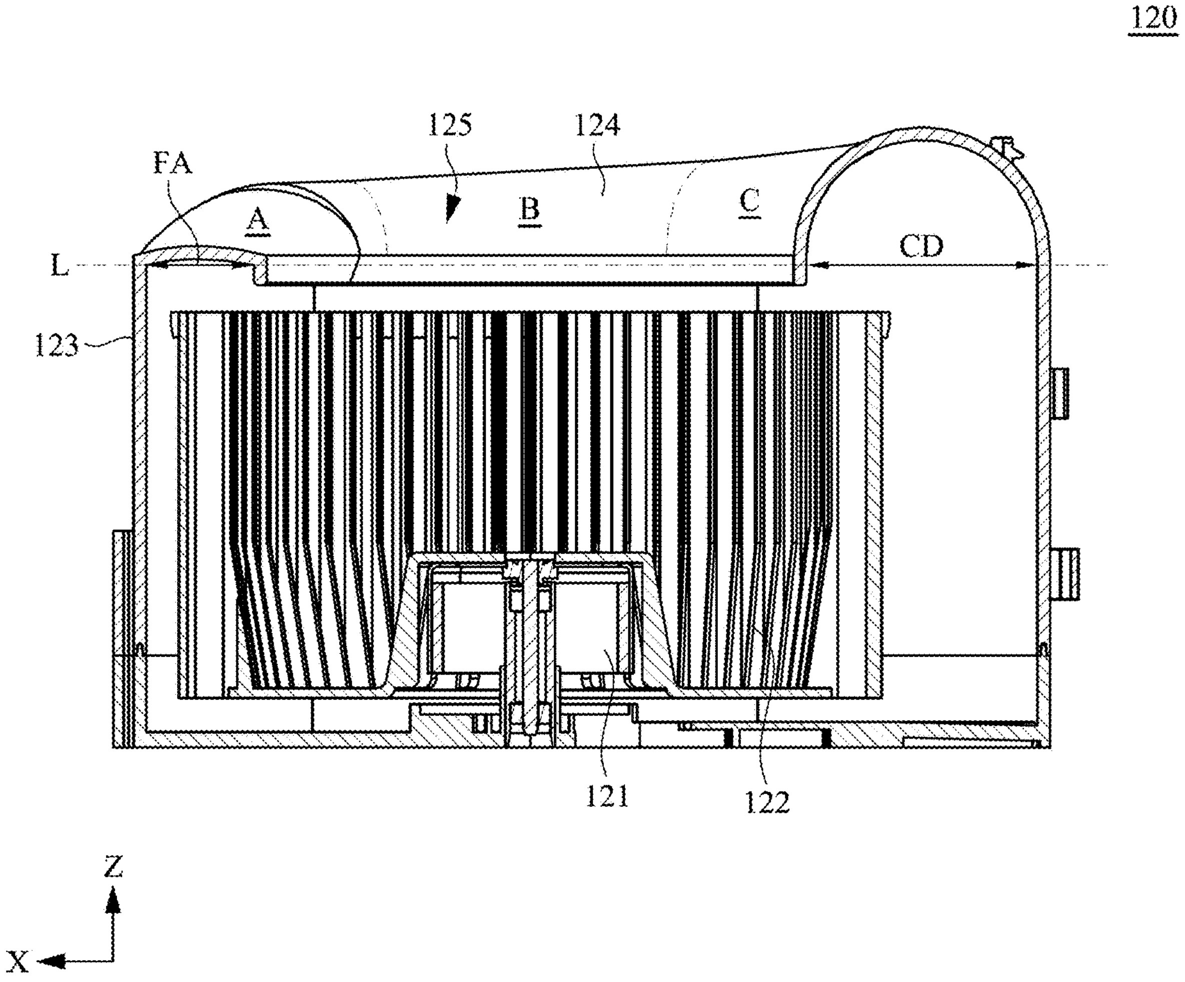
FIG. 11 is a cross-sectional view of the fan unit taken along line 11-11 of FIG. 10.

FIG. 11 is a cross-sectional view of the fan unit 120 taken along line 11-11 shown in FIG. 10. As shown in FIGS. 10 and 11, a horizontal line L is the position corresponding to the top edge of the air outlet $O_{out}$. The top portion 124 of the vortex flow channel 123 has diameters where the horizontal line L passes. The top portion 124 of the vortex flow channel 123 has a diameter FA between the area F and the area A, and has a diameter CD between the area C and the area D. As shown in FIG. 11, the diameter CD is greater than the diameter FA. Similarly, a diameter AB between the area A and the area B is greater than the diameter FA, a diameter BC between the area B and the area C is greater than the diameter AB between the area A and the area B, and the diameter CD between the area C and the area D is greater than the diameter BC between the area B and the area C.

Figure 12:
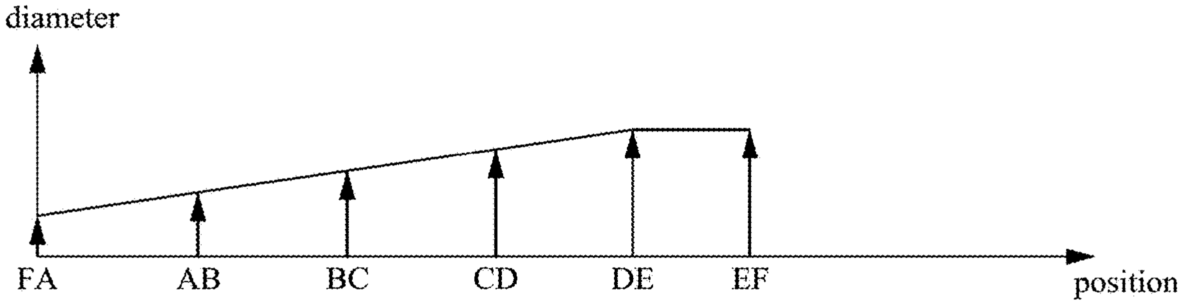
FIG. 12 shows the diameter variation at different positions of the top portion of a vortex flow channel of FIG. 10.

FIG. 12 shows the diameter variation at different positions of the top portion 124 of the vortex flow channel 123 shown in FIG. 10. The term “different positions” is referred to as the positions of the top portion 124 of the vortex flow channel 123 along the circumferential direction d shown in FIG. 10. As shown in FIG. 12, the horizontal axis of FIG. 12 shows positions between two adjacent areas along the circumferential direction d, and the vertical axis of FIG. 12 shows corresponding diameters. On the top portion 124 of the vortex flow channel 123, the horizontal axis of FIG. 12 from left to right sequentially shows the diameter FA between the area F and the area A, the diameter AB between the area A and the area B, the diameter BC between the area B and the area C, the diameter CD between the area C and the area D, the diameter DE between the area D and the area E, and the diameter EF between the area E and the area F. Based on the variation of the diameter shown in FIG. 12, the diameter of the top portion 124 of the vortex flow channel 123 is gradually increased from the area A to the area E along the circumferential direction d, and the diameter DE of the curved surface 125 of the vortex flow channel 123 between the area D and the area E is substantially the same as the diameter EF between the area E and the area F. The maximum diameter of the curved surface 125 of the vortex flow channel 123 is in the area passed by the cross section CS, such as an area between the area E and the area F.

Figure 13:
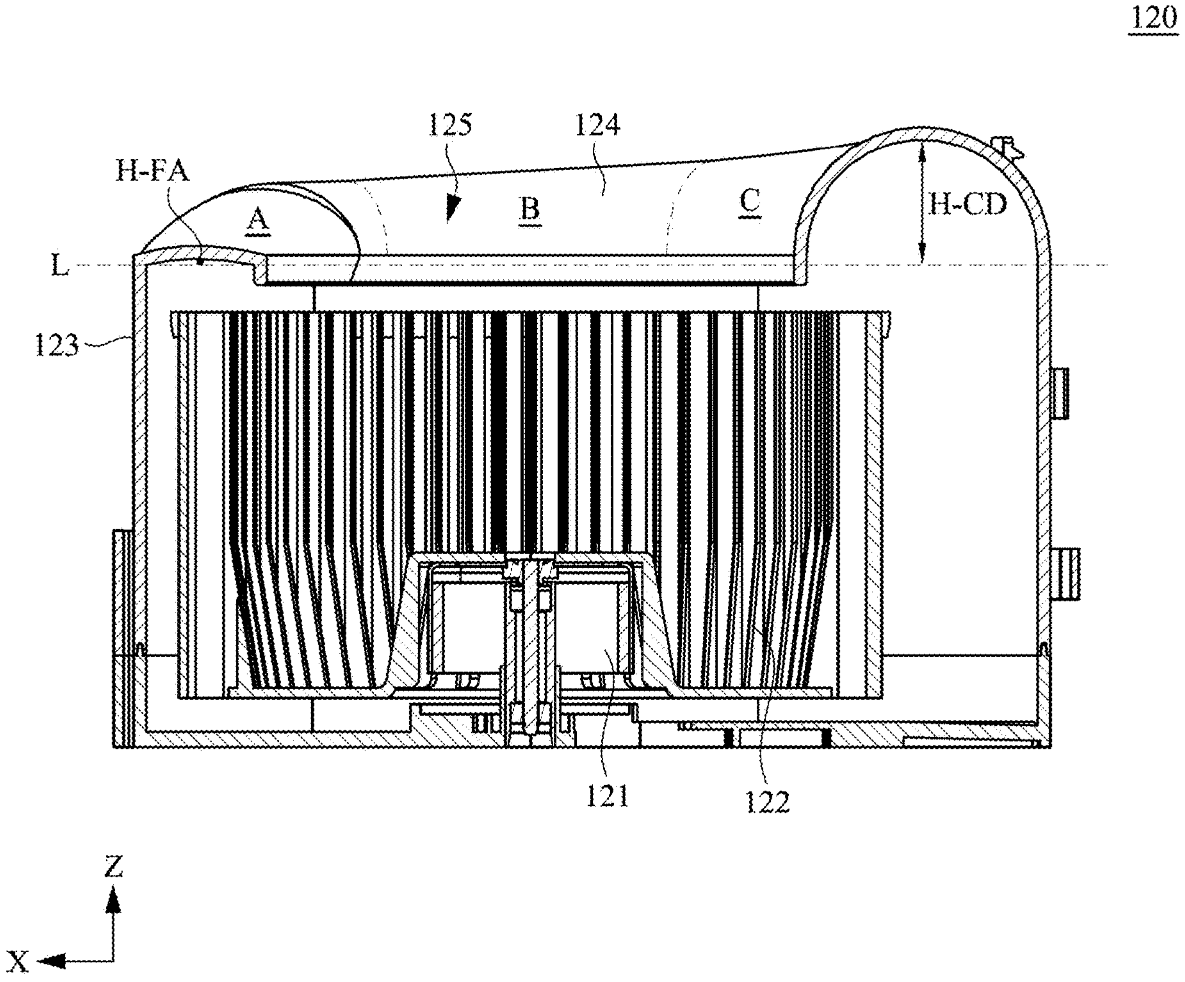
FIG. 13 is a cross-sectional view of the fan unit of FIG. 10.

FIG. 13 is a cross-sectional view of the fan unit 120 shown in FIG. 10. As shown in FIGS. 10 and 13, the top portion 124 of the vortex flow channel 123 includes a flat surface 126 proximal to the air outlet $O_{out}$. For example, the flat surface 126 may be in a part of the area F. Cross-sectional heights are formed between the top portion 124 of the vortex flow channel 123 and the horizontal line L. The top portion 124 of the vortex flow channel 123 has a cross-sectional height H-FA between the area F and the area A, and has a cross-sectional height H-CD between the area C and the area D. As shown in FIG. 13, the cross-sectional height H-CD is greater than the cross-sectional height H-FA, and the cross-sectional height H-FA is almost zero due to the interface between the flat surface 126 of the area F and the curved surface 125 of the area A. Similarly, a cross-sectional height H-AB between the area A and the area B is greater than the cross-sectional height H-FA, a cross-sectional height H-BC between the area B and the area C is greater than the cross-sectional height H-AB between the area A and the area B, and the cross-sectional height H-CD between the area C and the area D is greater than the cross-sectional height H-BC between the area B and the area C.

Figure 14:
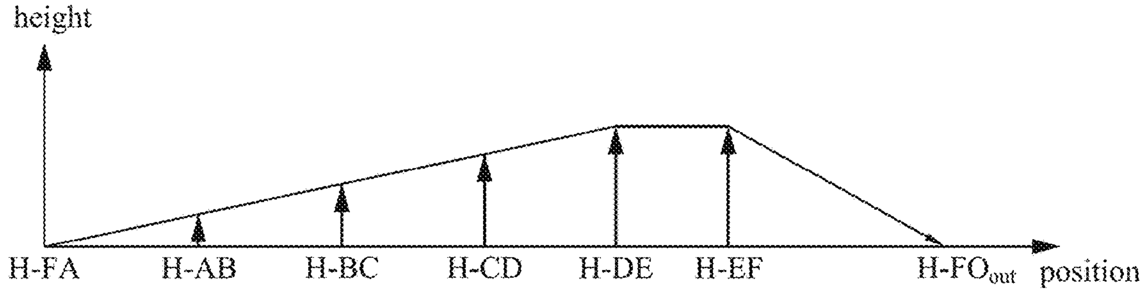
FIG. 14 shows the cross-sectional height variation at different positions of the top portion of the vortex flow channel of FIG. 10.

FIG. 14 shows the cross-sectional height variation at different positions of the top portion 124 of the vortex flow channel 123 shown in FIG. 10. As shown in FIGS. 10 and 14, the horizontal axis of FIG. 14 shows positions between two adjacent areas along the circumferential direction d, and the vertical axis of FIG. 14 shows corresponding cross-sectional heights. To combine with FIG. 10, on the top portion 124 of the vortex flow channel 123, the horizontal axis of FIG. 14 from left to right sequentially shows the cross-sectional height H-FA between the area F and the area A, the cross-sectional height H-AB between the area A and the area B, the cross-sectional height H-BC between the area B and the area C, the cross-sectional height H-CD between the area C and the area D, the cross-sectional height H-DE between the area D and the area E, the cross-sectional height H-EF between the area E and the area F, and the cross-sectional height H-FO$_{out}$ between the area F and the air outlet O$_{out}$. Based on the variation of the cross-sectional height of FIG. 14, the cross-sectional height of the top portion 124 of the vortex flow channel 123 is gradually increased from the area A to the area E along the circumferential direction d, and the cross-sectional height of the curved surface 125 of the vortex flow channel 123 between the area D and the area E is substantially the same as the cross-sectional height between the area E and the area F. The maximum cross-sectional height of the curved surface 125 of the vortex flow channel 123 is in the area passed by the cross section CS, such as an area between the area E and the area F.

Furthermore, in the embodiment, the top portion 124 of the vortex flow channel 123 from the area passed by the cross section CS to the air outlet O$_{out}$ is a part of the curved surface 125, but the cross-sectional height of the aforementioned portions of the curved surface 125 are gradually decreased from the area passed by the cross section CS (e.g., an area between the area E and the area F) to the air outlet O$_{out}$ along the circumferential direction d.

Figure 15:
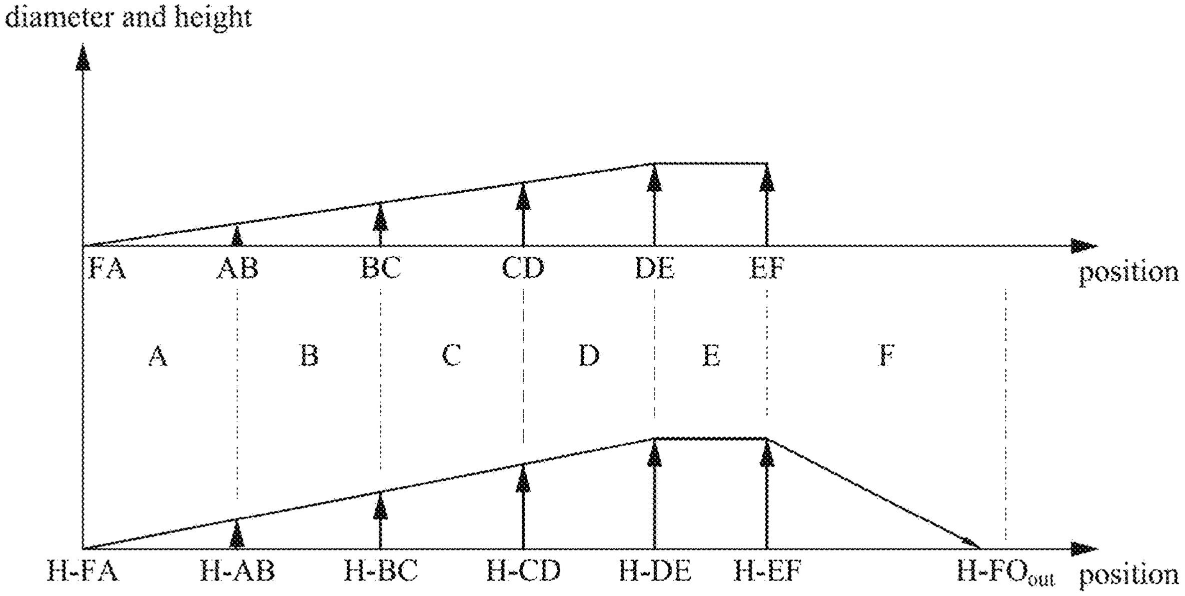
FIG. 15 shows the diameter variation and the cross-sectional height variation at different positions of the top portion of the vortex flow channel of FIG. 10.

FIG. 15 shows the diameter variation and the cross-sectional height variation at different positions of the top portion 124 of the vortex flow channel 123 of FIG. 10, in which FIG. 15 is the integrated relationship diagrams of FIGS. 12 and 14. FIG. 15 shows that the diameter and the cross-sectional height of the curved surface 125 of the top portion 124 of the vortex flow channel 123 are gradually increased from the beginning of the area A to the beginning of the area E along the circumferential direction d, each of the diameter and the cross-sectional height of the curved surface 125 of the top portion 124 of the vortex flow channel 123 in the area E can maintain the same, and the cross-sectional height of the curved surface 125 of the top portion 124 of the vortex flow channel 123 are gradually decreased from the beginning of the area F (i.e., the area passed by the cross section CS) to the end of the area F (i.e., the area adjacent to the air outlet O$_{out}$). In this embodiment, the beginning of the area A is the interface between the flat surface 126 and the curved surface 125, and thus the cross-sectional height is gradually increased from zero. The end of the area F is the flat surface 126 (i.e., the top edge of the air outlet O$_{out}$), and thus the cross-sectional height is gradually decreased to zero.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A cover, comprising:

a noise reduction structure having an air inlet, a flat portion surrounding the air inlet, and a peripheral portion surrounding the flat portion, wherein a sidewall of the flat portion extends in a vertical direction from the peripheral portion, a bottom surface of the flat portion extends in a horizontal direction from the sidewall of the flat portion, and the bottom surface of the flat portion is a flat surface, an entirety of the air inlet is located in the flat portion, and a bottom edge of the air inlet is laterally aligned with the bottom surface of the flat portion, and there is an opening extends from the peripheral portion through the sidewall of the flat portion to a bottom surface of the peripheral portion;

a shelter disposed on the peripheral portion and covers the air inlet; and a spring element connected to the shelter and passing through the opening.

2. The cover of claim 1, wherein the flat portion is configured to be positioned in a housing.

3. The cover of claim 1, wherein an end of the spring element facing away from the shelter is configured to be positioned in a housing.

4. The cover of claim 1, wherein the shelter has a column spacer located on the peripheral portion of the noise reduction structure, such that a gap between the shelter and the noise reduction structure.

5. The cover of claim 1, wherein an outer edge of the shelter is further outside than an outer edge of the peripheral portion of the noise reduction structure.

6. The cover of claim 1, wherein the peripheral portion of the noise reduction structure has a fastening recess, the shelter has a fastening hook coupled with the fastening recess.

7. The cover of claim 1, wherein a bottom surface of the shelter is lower than the bottom surface of the peripheral portion.

8. A fan unit, comprising:

a motor;

an impeller connected to the motor; and a vortex flow channel surrounding the impeller along a circumferential direction of the impeller, and having an air outlet, wherein a top portion of the vortex flow channel comprises a curved surface, a diameter and a cross-sectional height of the curved surface are gradually increased from the air outlet to an area along the circumferential direction, and the area is passed by a cross section that passes through a center of the impeller and is parallel to the air outlet, and said cross section passing through the center of the impeller is parallel to another cross section where the air outlet is, and the cross-sectional height of the curved surface is gradually decreased from the area to the air outlet along the circumferential direction, and a distance along the circumferential direction where the cross-sectional height of the curved surface gradually increases is greater than a distance along the circumferential direction where the cross-sectional height of the curved surface gradually decreases.

9. The fan unit of claim 8, wherein the vortex flow channel has a tongue portion proximal to the air outlet, and the top portion of the vortex flow channel comprises a flat surface proximal to the air outlet.

10. The fan unit of claim 8, wherein the maximum diameter of the curved surface of the vortex flow channel is in said area.

11. The fan unit of claim 8, wherein the maximum cross-sectional height of the curved surface of the vortex flow channel is in said area.

12. The fan unit of claim 8, wherein the top portion of the vortex flow channel from the area to the air outlet is a part of the curved surface.

13. A ventilation fan, comprising:

a housing, wherein a top edge of the housing surrounds an opening;

a fan unit located in the housing and comprising:

a motor;

an impeller connected to the motor; and a vortex flow channel surrounding the impeller along a circumferential direction of the impeller, and having an air outlet, wherein a top portion of the vortex flow channel comprises a curved surface, a diameter and a cross-sectional height of the curved surface are gradually increased from the air outlet to an area along the circumferential direction, and the area is passed by a cross section that passes through a center of the impeller and is parallel to the air outlet, and said cross section passing through the center of the impeller is parallel to another cross section where the air outlet is, and the cross-sectional height of the curved surface is gradually decreased from the area to the air outlet along the circumferential direction, and a distance along the circumferential direction where the cross-sectional height of the curved surface gradually increases is greater than a distance along the circumferential direction where the cross-sectional height of the curved surface gradually decreases; and a cover located on the top edge of the housing and covering the opening, and comprising:

a noise reduction structure having an air inlet, a flat portion surrounding the air inlet, and a peripheral portion surrounding the flat portion, wherein a sidewall of the flat portion extends in a vertical direction from the peripheral portion, a bottom surface of the flat portion extends in a horizontal direction from the sidewall of the flat portion, and the bottom surface of the flat portion is a flat surface, an entirety of the air inlet is located in the flat portion, and a bottom edge of the air inlet is laterally aligned with the bottom surface of the flat portion, and there is an opening extends from the peripheral portion through the sidewall of the flat portion to a bottom surface of the peripheral portion;

a shelter disposed on the peripheral portion and covers the air inlet; and a spring element connected to the shelter and passing through the opening.

14. The ventilation fan of claim 13, wherein the bottom surface of the flat portion is lower than the top edge of the housing such that the flat portion is located in the housing.

15. The ventilation fan of claim 13, wherein the peripheral portion of the noise reduction structure extends outward from an outer sidewall of the housing.

16. The ventilation fan of claim 13, wherein the sidewall of the flat portion of the noise reduction structure faces toward an inner sidewall of the housing.

17. The ventilation fan of claim 13, wherein there are different vertical distances between the flat portion of the noise reduction structure and the top portion of the vortex flow channel.

* * * * *